United States Patent [19]

Nagengast et al.

[11] Patent Number: 5,360,282

[45] Date of Patent: Nov. 1, 1994

[54] VEHICLE HEADLAMP ADJUSTER BALL AND SOCKET ASSEMBLY

[75] Inventors: William E. Nagengast; Leslie H. Hallgarth; Brian E. Witte, all of Anderson; Paul E. Young, Jr., Muncie, all of Ind.

[73] Assignee: General Motors Corporation, Detroit, Mich.

[21] Appl. No.: 181,136

[22] Filed: Jan. 13, 1994

Related U.S. Application Data

[63] Continuation of Ser. No. 143,733, Nov. 1, 1993, abandoned.

[51] Int. Cl.⁵ .......................... F21V 3/00; F16C 11/05
[52] U.S. Cl. .................................... 403/131; 403/130; 403/122; 403/119
[58] Field of Search ............... 403/131, 130, 128, 123, 403/122, 121, 119; 362/66, 428

[56] References Cited

U.S. PATENT DOCUMENTS

| | | | |
|---|---|---|---|
| 2,230,853 | 2/1941 | Wells | 403/131 |
| 2,859,060 | 11/1958 | Davies et al. | |
| 3,862,807 | 1/1975 | Doden et al. | |
| 4,707,769 | 11/1987 | Van Duyn | |
| 4,707,770 | 11/1987 | Van Duyn | |
| 4,707,771 | 11/1987 | Van Duyn et al. | 362/66 |
| 4,769,958 | 7/1987 | Mizusawa et al. | |
| 4,889,356 | 12/1989 | Morris | 403/131 |
| 4,904,107 | 2/1990 | Fukukawa et al. | |
| 5,153,976 | 10/1992 | Benchaar et al. | |

Primary Examiner—Randolph A. Reese
Assistant Examiner—Anthony Knight
Attorney, Agent, or Firm—Ernest E. Helms

[57] ABSTRACT

A ball and socket joint arrangement for mounting a vehicle headlamp assembly to a vehicle is provided which in a preferred embodiment includes a body connected with the headlamp assembly and having an interior spheroid aperture intersected by first and second apertures with a plug in the second aperture, a portion of the plug forming the spheroid aperture; a ball for pivotally mounting within the body spheroid aperture having pivotal motion on at least two axes, the ball having a bore generally aligned with the first aperture and a circumferential groove, the circumferential groove forming a slot with the bore in two geometrically spaced locations; a rod connected with the vehicle for insertion into the bore of the ball and having a circumferential groove aligned with the circumferential groove of the ball; and an omega spring mounted within the circumferential groove of the ball retaining the rod to the ball after insertion of the rod into the bore of the ball by projecting into the slot of the ball and locating within the circumferential groove of the rod.

7 Claims, 3 Drawing Sheets

VEHICLE HEADLAMP ADJUSTER BALL AND SOCKET ASSEMBLY

This is a continuation of U.S. Ser. No. 08/143,733 filed Nov. 1, 1993, now abandoned.

FIELD OF THE INVENTION

The field of the present invention is that of ball and socket joint arrangements. More particularly, the field of the present invention relates to ball and socket arrangements used for mounting headlamp assemblies into vehicles.

BACKGROUND OF THE INVENTION

Headlamp assemblies which typically comprise a reflector housing and connected lens are typically connected to the vehicle body via two adjuster screws and a fixed pivot shaft. The adjuster screws and the pivot shaft each have a ball at their ends which are captured in sockets. The sockets are fixably connected with the reflector housing. The sockets are typically two-pan members. Assembly requires that the housing and sockets be pushed against the pivot shaft and adjuster balls. A plug on the sockets is thereafter pushed in on the sockets to capture the ball within the socket body. It is desirable to simplicity, the above-noted process to allow the reflector housing to be pushed against the adjuster screws, and attachment of the housing to the adjuster screws and the pivot shaft to be effectuated simply by the push. Not only would the above eliminate a second task (of pushing in the plug), but it would allow more design flexibility by allowing placement of the sockets in areas where they would not be reachable by hand to push in the plug after the housing has been located with the adjuster screws and pivot shaft. An example of a push-type ball and socket arrangement is shown in Benchaar et al, U.S. Pat. No. 5,153,976.

SUMMARY OF THE INVENTION

The present invention provides an alternative to Benchaar et al which is more suitable to the technical environment to which applicants' invention has been applied, namely that of the assembly of headlamp assemblies into automotive vehicles.

The present inventive ball and socket arrangement provides a mechanism for attachment of a vehicle headlamp to the vehicle that permits vertical or horizontal aim of the headlamp. A headlamp mounting bracket may be preassembled to the vehicle, on the assembly line, before assembly of the headlamp itself to the vehicle. The present invention then permits the headlamp assembly to snap-fit to the mounting bracket attachments at final vehicle assembly lines, onto two adjustment screws and a fixed pivot shaft (the three points of attachment to the vehicle). The inventive ball and socket arrangement also permits elimination of the mounting bracket, and the independent (prior to headlamp assembly) installation of the headlamp adjusters and headlamp fixed pivot shaft to the vehicle structural panels.

Each of these three points of attachment has identically-shaped screw shafts that have grooves in the ends of them that permit a steel spring to snap into and lock the screw in place. The steel spring itself is held within a spherically-shaped unit that is held within a ball socket assembly that permits the headlamp to pivot during aiming but securely attaches the headlamp to the vehicle.

DESCRIPTION OF THE PREFERRED EMBODIMENT

Figure 1:
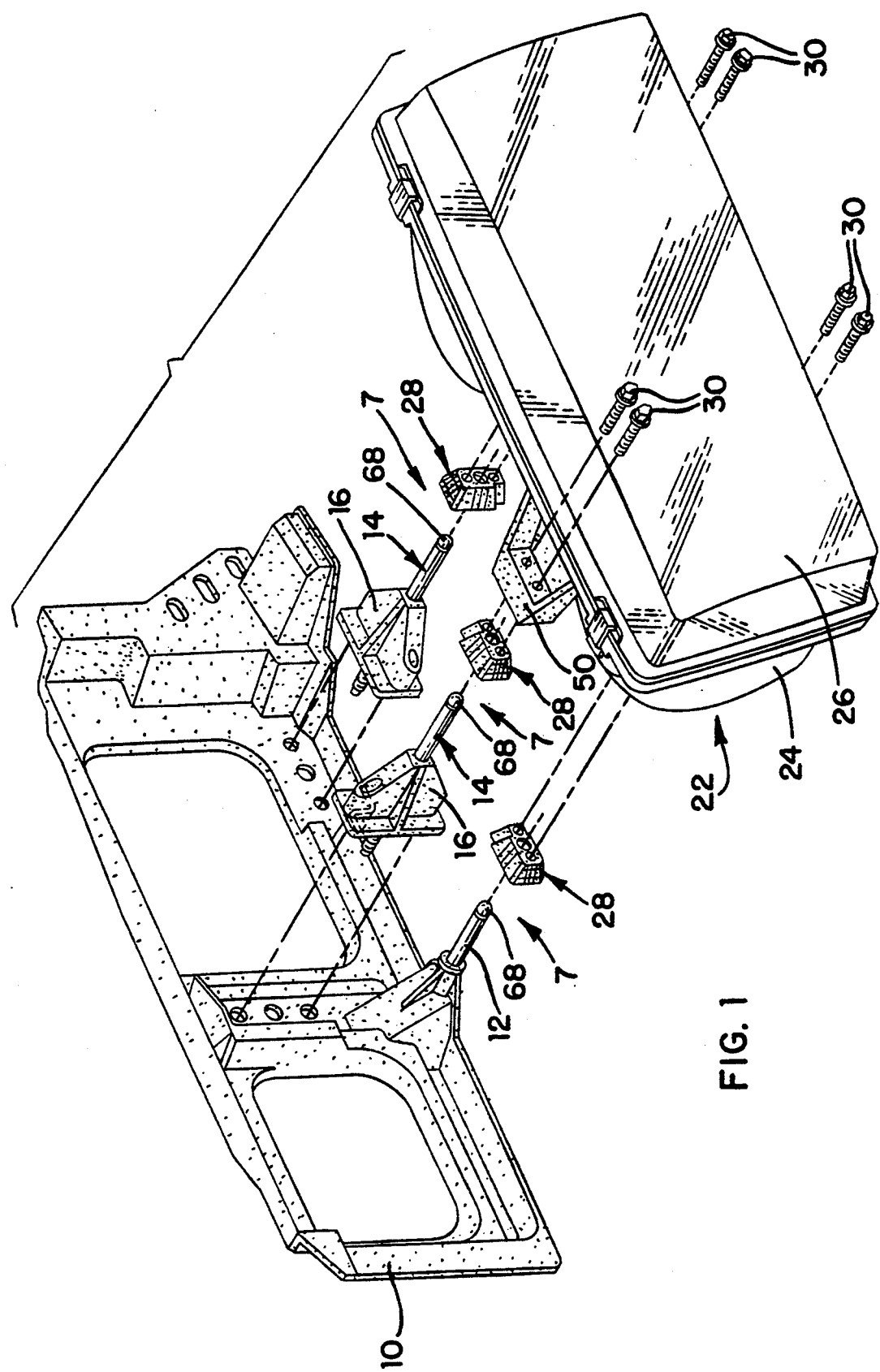
FIG. 1 is an exploded view of a preferred embodiment ball and socket arrangement according to the present invention in the environment of a vehicle headlamp assembly mounting arrangement.
Figure 2:
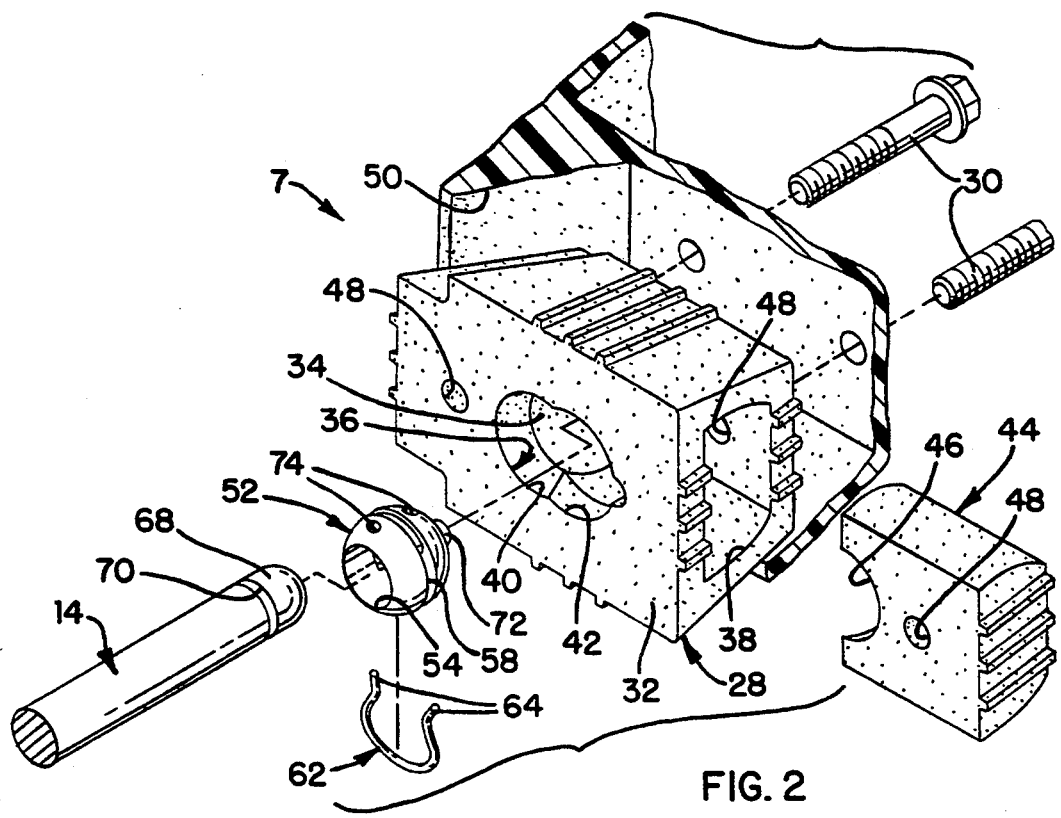
FIG. 2 is an enlarged exploded view of the present invention shown in FIG. 1.
Figure 3:
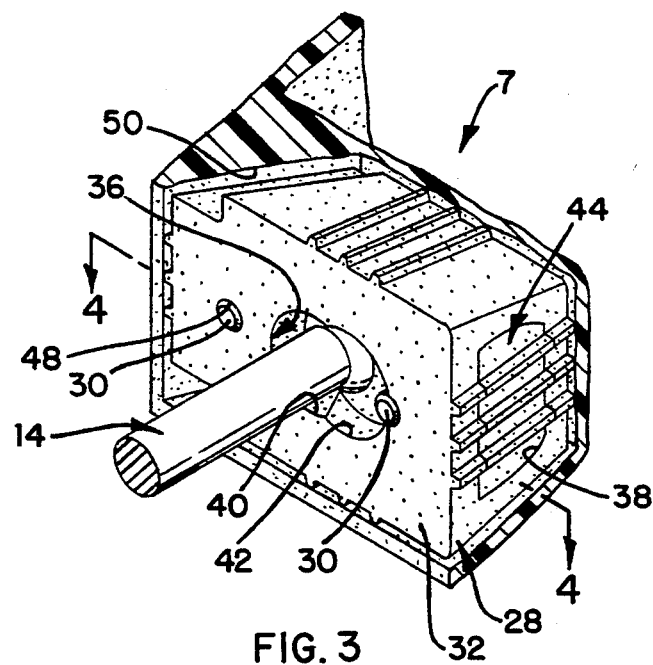
FIG. 3 is a view similar to FIG. 2 with the rod connected to the socket.
Figure 4:
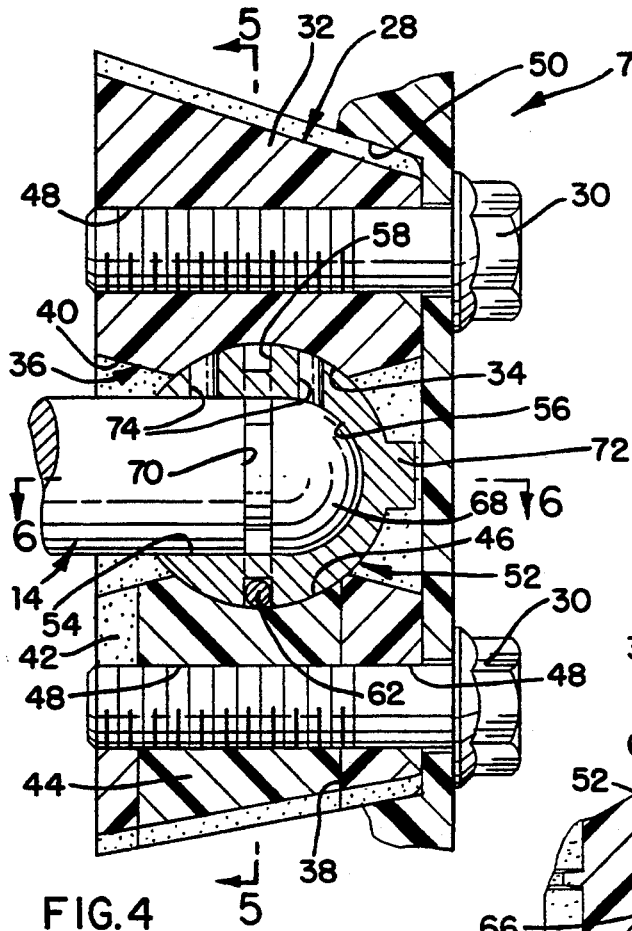
FIG. 4 is a view taken along line 4—4 of FIG. 3.
Figure 5:
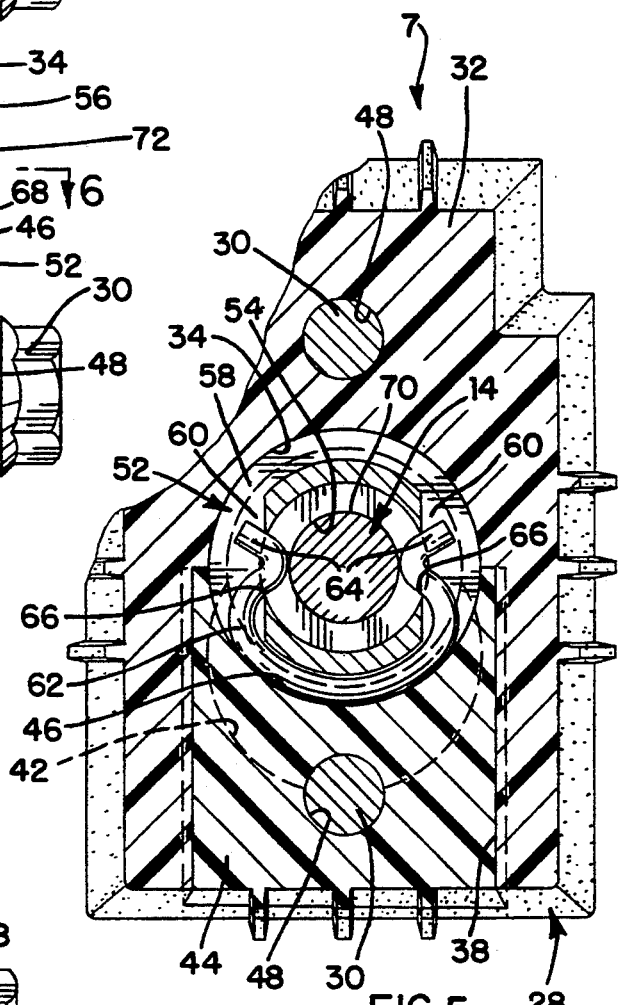
FIGS. 5 and 6 are views taken along lines 5—5 and 6—6 of FIG. 4, respectively.
Figure 6:
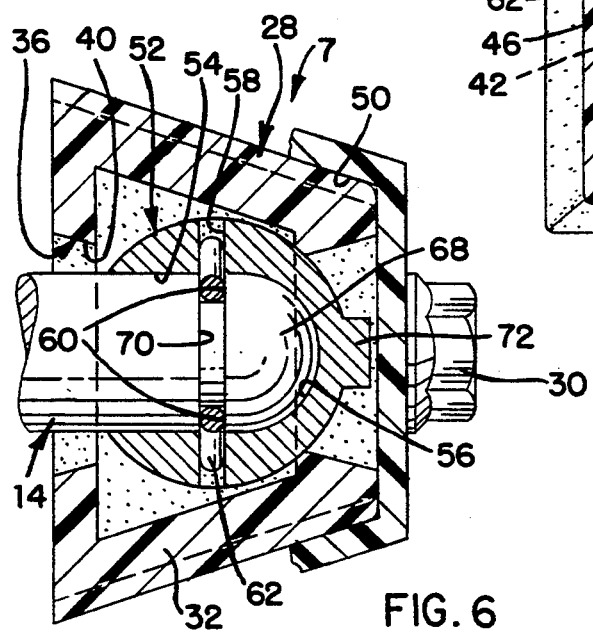

FIG. 1 is an exploded view illustrating the environment of applicants' inventive ball and socket arrangement 7. Fixably connected to a vehicle frame (not shown) is an installation bracket 10. The installation bracket 10 has mounted thereto a pivot shaft mounting 12 and two adjuster screws 14. Each adjuster screw 14 has an adjusting mechanism 16 which allows the adjustment screw 14 to be extended or retracted via rotation of the adjustment screw 14 by a tool that attaches to and rotates the rearmost end of the adjustment screw 14, so as to set the adjustment (aim) of the headlamp assembly 22.

The headlamp assembly 22 has a reflector housing 24 with an attached lens 26. The reflector housing 24 has three fixably connected mounting pockets 50 (only one is shown). Each mounting pocket 50 is fixably attached by bolts 30 to a socket housing 28. When installed in the vehicle, the reflector housing 24 will have a lightbulb and bulb retainer housing (not shown) attached thereto. The installer will simply push the headlamp assembly 22 toward the mounting plate 10, whereupon the two adjustment screws 14 and pivot shaft 12 enter the three socket housings 28 and snap-lock into a fixed engagement, and the headlamp assembly 22 will be attached to the vehicle. Of course, to those familiar with the art, electrical connections will also have to be made subsequent to or prior to the above-noted operation.

Referring additionally to FIGS. 2 through 6, the socket housings 28 have a body 32 which is typically fabricated or molded from a polymeric plastic-like material such as Black Nylon as supplied by DuPont under the tradename Zytel 408 HS (heat stabilized). The socket body has a generally spherical interior aperture 34 (FIG. 4) which is intersected by a first top apemare 36 and a second side aperture 38.

The first apemare 36 is formed by the intersection of a small partial conical section 40 with a slightly larger partial conical section 42. Insertable into the second apemare 38 is a plug 44. Optionally, the plug 44 may have a snap-in or detent interaction with the body wherein, in a first detented position, the plug is generally held in the body 32 during the manufacturing process partially inserted within the second apemare 38, and a second locking detent position when the plug 44 is fully inserted within the second apemare 38. A portion 46 of the plug 44 also helps form part of the spherical apemare 34 of the body 32.

The body 32 has two bores 48 which allow the socket housing 28 to be attached to the reflector housing 24 by the threaded fasteners 30. Additionally, one of the bores 48 also extends through the plug 44. Thus, when the plug 44 is fully installed, it is further locked in position by one of the fasteners 30.

Mounted into the spherical aperture 34 of the body through the first aperture 36 through the partial conical section 42 (with the plug 44 removed) is a spherical member or ball 52. The ball has a bore 54 generally aligned with the conical section 40 first aperture 36 of the body, having a hemispherical blind end 56. Additionally, the ball 52 has a generally circumferential groove 58 along its outer periphery with two generally parallel slots 60 which intersect with the bore of the ball 54. The intersection of the slots is usually in two locations geometrically spaced from one another. The ball is pivotable within the spherical aperture 34 of the body and on at least two axes. The material of the ball 54 can be molded plastic of the same material as described for the body 32, or it can be molded of SAE zinc base die cast and coated with a chromate finish, or it can be a die cast of an ACuZinc alloy. Optional holes 74 and stud member 72 may be added to the ball 52 as desired to facilitate robot or automated assembly of the ball 52 into the body 32.

Before an insertion of the ball 52 into the spherical aperture 34, an omega spring 62 is inserted in the circumferential groove 58 of the ball 52. The omega spring 62 usually has its end turns 64 nested within the slots 60 and projecting into windows 66 formed by the intersection of the slots 60 with the bore 54 of the ball. Typically, the ball 52 will be inserted such that the projection of the spring turns 64 with the bore 54 of the ball will be at a generally right angle to the axis of the adjustment screw 14 so as to permit spring turns 64 to engage (snap into) groove 70 of the adjustment screw 14.

The spring material is 0.031 inch diameter type 302 stainless steel wire. The wire has clearance for the spring turns 64 but wedges tightly in the circumferential groove of the ball 58 between the spring turns 64 to avoid headlamp flutter.

Each adjustment screw 14 and pivot shaft mounting 12 has a rounded end 68 for insertion into the bore 54 of the ball. Additionally, each adjustment screw 14 and pivot shaft mounting 12 has a circumferential groove 70 for general alignment with the circumferential groove 58 provided in the ball. The ball and socket assembly 7 connection is made by pushing the reflector housing 24, which contains the socket housings 28, toward the adjustment screws 14 and the pivot shaft mounting 12. Insertion of the shaft 12 and screws 14 within the bores 54 of the ball 52 is effectuated whereby the omega spring 62 will clip into the rod circumferential grooves 70 and attachment will be made.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A ball and socket joint arrangement comprising:
  a body having an interior spheroid aperture intersected by a first aperture;
  a spheroid for mounting within the body spheroid aperture having at least pivotal motion along at least two axes, the spheroid having a bore generally aligned with the first aperture and a circumferential groove, the circumferential groove having at least one slot intersecting the first bore;
  a rod for insertion into the first bore of the spherical body through the body first aperture, the rod having a circumferential groove for alignment with the circumferential groove of the spherical member; and
  a retainer for insertion into the circumferential grooves of the spheroid and the rod via the slot in the circumferential groove of the spheroid, the retainer affixing the rod with the spheroid member after insertion of the rod into the bore of the spheroid member.

2. An arrangement as described in claim 1 wherein the body has a second aperture intersecting the spheroid aperture with a plug fitted therein, the plug having a portion defining part of the spheroid aperture of the body.

3. An arrangement as described in claim 1 wherein the retainer member is an omega spring clip.

4. An arrangement as described in claim 1 wherein the spheroid circumferential groove has at least two geometrically spaced slots.

5. A ball and socket joint arrangement comprising:
  a body having an interior spheroid aperture intersected by first and second apertures with a plug in the second aperture, a portion of the plus, forming the spheroid aperture;
  a ball for pivotally mounting within the body spheroid aperture having pivotal motion on at least two axes, the ball having a bore generally aligned with the first aperture and a circumferential groove, the circumferential groove forming a slot with the bore in two geometrically spaced locations;
  a rod for insertion into the bore of the ball, the rod having a circumferential groove aligned with the circumferential groove of the ball; and
  an omega spring mounted within the circumferential groove of the ball retaining the rod to the ball after insertion of the rod into the bore of the ball by projecting into the slot of the ball and locating within the circumferential slot of the rod.

6. A ball and socket joint arrangement for mounting a vehicle headlamp assembly to a vehicle comprising:
  a body connected with the headlamp assembly, the body having an interior spheroid aperture intersected by a first aperture;
  a spheroid for mounting within the body spheroid aperture having at least pivotal motion along at least two axes, the spheroid having a bore generally aligned with the first aperture and a circumferential groove, the circumferential groove having at least one slot intersecting the first bore;
  a rod connected with the vehicle for insertion into the first bore of the spherical body through the body first aperture, the rod having a circumferential groove for alignment with the circumferential groove of the spherical member; and
  a retainer for insertion into the circumferential grooves of the spheroid and the rod via the slot in the circumferential groove of the spheroid, the retainer affixing the rod with the spheroid member after insertion of the rod into the bore of the spheroid member.

7. A ball and socket joint arrangement for mounting a vehicle headlamp assembly to a vehicle comprising:
  a body connected with the headlamp assembly, the body having an interior spheroid aperture intersected by first and second apertures with a plug in the second aperture, a portion of the plug forming the spheroid aperture;

a ball for pivotally mounting within the body spheroid aperture having pivotal motion on at least two axes, the ball having a bore generally aligned with the first aperture and a circumferential groove, the circumferential groove forming a slot with the bore in two geometrically spaced locations;

a rod connected with the vehicle for insertion into the bore of the ball, the rod having a circumferential groove aligned with the circumferential groove of the ball; and an omega spring mounted within the circumferential groove of the ball retaining the rod to the ball after insertion of the rod into the bore of the ball by projecting into the slot of the ball and locating within the circumferential groove of the rod.

* * * * *